United States Patent
Bakker et al.

(10) Patent No.: US 6,476,185 B1
(45) Date of Patent: Nov. 5, 2002

(54) PREPARATION OF AN ORGANIC COMPOUND BY A CONDENSATION REACTION

(75) Inventors: Wridzer Jan Willem Bakker, Arnhem (NL); Wilhelmus Louisa Petrus Maria Rutten, Velp (NL); Johannes Theodorus Faustinus Keurentjes, Renkum (NL); Matthias Wessling, Enschede (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/713,167

(22) Filed: Nov. 15, 2000

Related U.S. Application Data

(63) Continuation of application No. PCT/EP99/03435, filed on May 15, 1999.

(30) Foreign Application Priority Data

May 20, 1998 (NL) ............................................. 1009218

(51) Int. Cl.[7] .................................................. C08F 6/00
(52) U.S. Cl. .................................. 528/480; 526/238.23
(58) Field of Search ....................... 528/480; 526/238.23

(56) References Cited

U.S. PATENT DOCUMENTS

| | | | |
|---|---|---|---|
| 4,329,449 A | 5/1982 | Roth et al. ................ | 536/18.6 |
| 5,009,789 A | 4/1991 | Helmer et al. ............... | 210/641 |
| 5,434,315 A | 7/1995 | Dorai et al. ................. | 568/621 |
| 5,545,829 A | 8/1996 | Brekner et al. .............. | 526/160 |
| 5,648,517 A | 7/1997 | Muller et al. ................ | 560/205 |

FOREIGN PATENT DOCUMENTS

| | | | |
|---|---|---|---|
| EP | 0 512 736 | 11/1992 | ............. C08F/6/20 |
| WO | WO 95/07915 | 3/1995 | ........... C07H/15/04 |

OTHER PUBLICATIONS

*Derwwent Abstract*, JP850236359, Oct. 24, 1985.
*Derwent Abstract*, JP2000730, Jan. 5, 1990.
*Patent Abstracts of Japan*, Naruto Satoshi, 62096453, May 2, 1987.
*International Search Report*, dated Oct. 15, 1999.

*Primary Examiner*—Terressa M. Boykin
(74) *Attorney, Agent, or Firm*—Ralph J. Mancini

(57) ABSTRACT

The invention pertains to a process for the preparation of an organic compound by a condensation reaction in which besides the organic compound other products are formed and one or more of the products formed during the preparation are extracted from the reaction mixture with the aid of a membrane. The reaction is carried out at a temperature above 80° C. and one or more of the products formed during the reaction are extracted from the reaction mixture by the aid of an inorganic membrane with an average pore size of the separating layer of less than 0.5 nm.

12 Claims, 1 Drawing Sheet

PREPARATION OF AN ORGANIC COMPOUND BY A CONDENSATION REACTION

Figure 1:
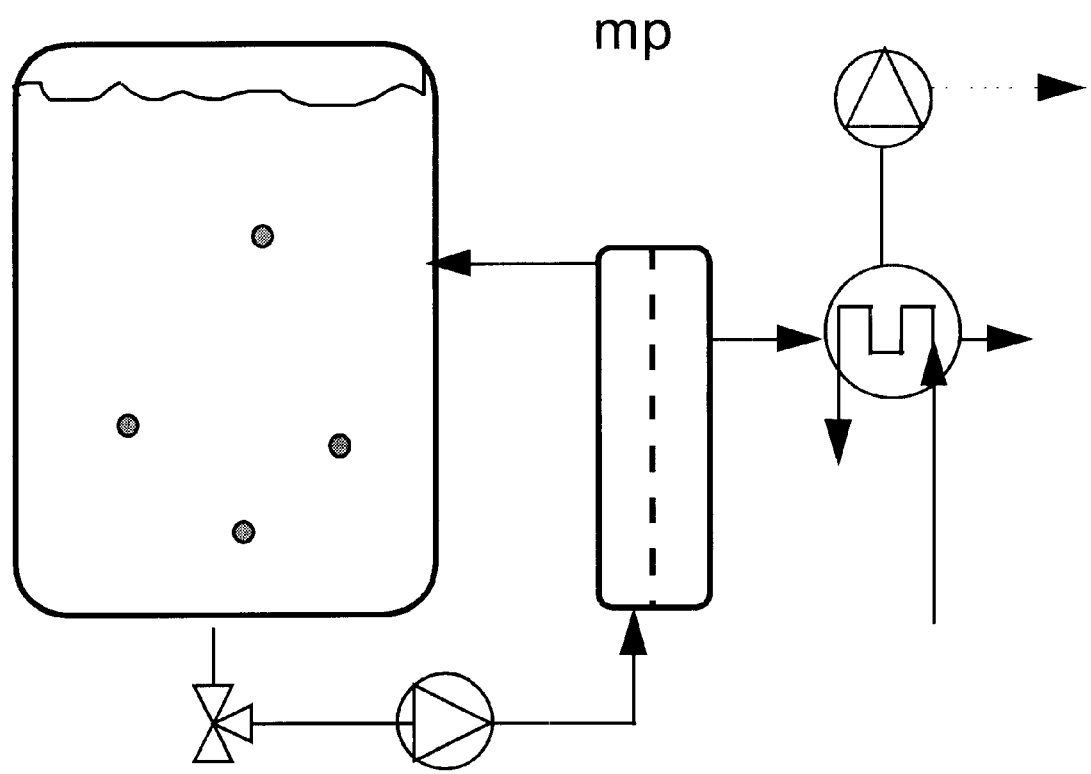

This is a continuation application of International Patent Application Ser. No. PCT/EP99/03435, filed on May 15, 1999 and which claims priority of Netherland Patent Application Serial No. 1009218, filed on May 20, 1998.

FIELD OF THE INVENTION

The invention pertains to a process for the preparation of an organic compound by a condensation reaction in which besides the organic compound other products are formed and one or more of these products are extracted from the reaction mixture with the aid of a membrane.

BACKGROUND OF THE INVENTION

In Japanese Laid-Open publication JP 02/000730 in the name of Nippon Seiroh KK, a process for preparing an ester is described in which the water produced during the reaction is separated with the aid of a water selective separation membrane. The publication discloses membranes based on polyimide or inorganic porous membranes with an average pore size from 0.5 to 5 nm. The preferred inorganic membranes, according to the examples, are membranes with an average pore size of 5 nm, and the separation takes place at 60° C. and 75° C.

WO 95/07915 and U.S. Pat. No. 5,648,517 also disclose preparative processes in which a membrane is employed to remove one or more of the components formed during the reaction from the reaction mixture.

In general, reactions in which an organic compound is obtained by condensation reactions (monocondensation and polycondensation) are equilibrium reactions. In order to convert a sufficient quantity of the starting material into the organic compound desired in such a reaction type, one or more of the compounds formed are often extracted from the reaction mixture to maintain a favourable overall reaction (high yield of the organic compound desired). In the case of an equilibrium reaction in which water, $NH_3$, methanol and/or ethanol is formed, these products can generally be extracted from the reaction mixture by means of distillation.

Distillation requires that the component to be separated is in the gas phase. Generally, this is achieved by heating the reaction mixture to such a high temperature that the component to be separated from the reaction mixture is removed by boiling. However, such a method has the drawback that, especially when the reaction mixture is viscous, there is bubble formation and foaming, causing additional fouling of the equipment and restricting the degree of filling of the reactor employed. The requirement of boiling limits the degrees of freedom with respect to operation temperature, pressure and choice of reactants. For example, if one of the reactants is very volatile compared to water (for example methanol) or forms an azeotrope with water (for example ethanol) the removal of water via the vapor phase is very inefficient (in particular with respect to reactor use and energy consumption), if possible at all.

With a view of conducting an economical process, it is advantageous to carry out reactions at the highest possible reaction rate. As a rule, it holds that the higher the reaction temperature is, the higher the reaction rate will be. However, the aforesaid foaming or bubble formation frequently makes it impossible to carry out the reaction at such a temperature as will give a sufficiently high reaction rate from the point of view of conducting an economical process. Of course the reaction rate will also be higher if one or more of the products formed during the reaction are extracted from the reaction mixture.

There is a clear need for a process in which the condensation reaction can be carried out at elevated temperature, and the withdrawal of at least one of the products formed during the reaction can be provided in an efficient manner.

The process as mentioned in JP 02/000730 is unsuitable for this purpose, because the polyimide membranes listed are not suited to prolonged use at elevated temperature, and the membranes cease to be active after a while, probably as a result of the membrane becoming clogged. Nor are the membranes of poly(vinyl alcohol) mentioned in the working examples of U.S. Pat. No. 5,648,517 suited to be used at high temperatures.

The active part of the membranes mentioned in WO 95/07915 consists of organic components, such as polyvinylalcohols, and these render said membranes less suitable for prolonged use at elevated temperature.

The present invention as summarized below has overcome the drawbacks of the prior art.

SUMMARY OF THE INVENTION

The present invention generally relates to a process for the preparation of an organic compound by a condensation reaction carried out at a temperature above 70° C. In said reaction, various other products are formed and such products are extracted from the reaction mixture with the aid of an inorganic membrane with an average pore size of the separating layer of less than 0.5 nm.

DETAILED DESCRIPTION OF THE INVENTION

According to the invention it has been found that an essential improvement can be achieved by performing the condensation reaction at a temperature above 70° C. up to 600° C., preferably above 100° C. up to 300° C., and extracting one or more of the products formed during the reaction by the aid of an inorganic membrane with an average pore size of the separating layer of less than 0.5 nm. Preferably the pores have an average pore size of 0.2 to 0.5 nm.

The reaction-pervaporation process of the invention may be performed in an equipment as illustrated in FIG. 1 and explained below.

Pervaporation tests show that the membrane of the invention has an unexpected high permeation flux of small compounds such as water, especially when considering the small diameter of the pores, but does not allow the reactants to pass through. Furthermore, the membrane has a high ability to maintain its cleanness even after being used for a long time. Cleaning will remain in some cases necessary but the choice of cleaning components and cleaning temperature is less limited than for polymeric membranes.

In addition, inorganic membranes with an average pore size of the separating layer of less than 0.5 nm are particularly suitable for use in heterogeneous reaction mixtures, i.e. mixtures containing both liquids and solid particles. Polymeric membranes generally are not suitable for use in heterogeneous systems, since the solid particles in that case will cause excessive wear of the membranes.

The process according to the present invention may be used in a large number of reactions in which it is favourable to remove one of the products formed particular the removal of water formed during condensation reactions, but also the removal of, for example, methanol, ethanol and/or $NH_3$ may be favourable. It can advantageously be performed in the equipment schematically shown in FIG. 1. The condensation reaction is performed in a reactor 1 and the reaction mixture is pumped via a conduit 2 to a pervaporation unit 3 containing a membrane (not shown). In the pervaporation unit the water formed during the reaction is separated from the rest of the reaction mixture. A vacuum pump 5 and a cold trap 7 facilitate the pervaporation and separation of water, which is discharged through a conduit 6. After the passing of the pervaporation unit the reaction mixture is returned through a conduit 8 to the reactor.

The process is especially suitable for preparing a polymer in a polycondensation reaction, i.e. a reaction in which water is one of the reaction products formed. One example of such a reaction is the formation of a resin, such as an alkyd resin, by reacting a mixture of acids, anhydrides, and alcohols, in which process a resin and water are formed. By extracting water during the reaction, which can be carried out at a temperature between 120° C. and 300° C., a resin can be obtained in what is a very advantageous manner economically. The comparatively high viscosity of the reaction mixture is no impediment in this case. In case the reaction involves the presence of low boiling compounds, such as methanol, it may be suitable to carry out the reaction at lower temperatures for example between 70° C. and 100° C.

The process of the invention is also particularly suitable to be used in acetalisation processes for example in the production of glycosides. In such a process compounds containing a hydroxyl group are reacted with saccharides. More specific the organic compound formed can be an alkyl glycoside having the formula

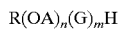

$R(OA)_n(G)_mH$ where R is a hydrocarbon group with 1–20, preferably 6–18 carbon atoms, A is an alkylene group having 2–4 carbon atoms and n is a number from 0–10, preferably 0–5, G is a saccharide residue and m is a number from 1–10, preferably 1–5, obtained by reacting $R(OA)_nH$ with a saccharide at a temperature from 80–130° C., preferably from 90–110° C.

Other examples of condensation reactions are esterification reactions between a compound containing at least one carboxylic group and an organic compound containing at least one hydroxyl group. Examples of suitable carboxylic compounds are mono-, di- or polycarboxylic acids and aminocarboxylic acids. Examples of suitable compounds containing at least one hydroxyl group are aliphatic alcohols, phenols, such as nonylphenol; alkylene glycol, polyethylene glycol, propylene glycol, polypropylene glycol, butylene glycol, polybutylene glycol, glycerol, trimetylolpropane, pentaerytritol, saccharides and saccharide derivates as well as alkoxylated products thereof.

The operation of a membrane is based on the fact that the component to be separated has different activities on the two sides of the membrane. Thus, the concentration of the component in the reaction mixture is (comparatively) high, while the concentration of the component on the other side of the membrane, where the component is carried away, is lower.

The membrane may be flat or tubular. The use of a tubular membrane is preferred, since a membrane having such a shape is easy to install in the reaction mixture, the inside of the membrane being closed off from the reaction mixture and the pressure on the inside of the membrane being reduced vis-à-vis the pressure in the reaction mixture, for example by connecting the inside of the membrane to a vacuum pump, or with an inert gas flowing through the inside of the membrane. Alternatively, the reaction mixture can be conveyed through the inside of the tubular membrane, while the component to be extracted can be carried away from the outside of the membrane.

The membrane employed in the process according to the present invention has an average pore size of less than 0.5 nm. For optimum service it is preferred to use a membrane with an average pore size of 0.2 to 0.5 nm.

Preference is given to the use of an inorganic membrane, such as a ceramic membrane, due to the mechanical strength and the chemical and thermal stability of such membranes. For example, the membranes can be based on zeolites, "carbon molecular sieves" and amorphous material, such as silica.

Furthermore, membranes, more particularly tubular membranes, can be used to cool or heat the reaction mixture, for example by conveying a liquid having a lower/higher temperature than the reaction mixture through the inside of the membrane. Such a membrane consequently is used as a heat exchanger.

Furthermore, if the membrane possesses sufficient mechanical strength (which is the case, e.g., with tubular ceramic membranes), it is possible to stir the reaction mixture with the aid of the membrane. This is particularly advantageous when the reaction mixture has a higher viscosity or when the reaction mixture is heterogeneous. In such a situation stirring the reaction mixture will also lead to an increased reaction rate.

Since many reactions, for example polymerisation reactions, require a catalyst to initiate and/or maintain the reaction, the membrane can be provided with a catalyst, for example by binding catalytically active particles to the surface of the membrane.

The process according to the invention also offers the possibility of carrying out a reaction as a continuous process, at least a portion of the reaction mixture being conveyed along the membrane, with one or more of the products formed during the reaction being extracted from the reaction mixture. Alternatively, the membrane can be installed in the reaction vessel, in which case one or more of the products formed are extracted from the reaction mixture during the reaction. In such set-ups the reaction can also be carried out in a closed reaction vessel under isochoric process conditions.

The invention will be further illustrated by the following nonlimiting examples.

EXAMPLES

The following examples show the manufacture of an alkyd resin, a methylated melamine resin, a butylated melamine resin, an alkyl glycoside and a polyglycerol in the equipment of FIG. 1. The membrane used was a tubular, microporous ceramic membrane manufactured by ECN (Energie Centrum Nederland). The separating layer of this membrane is composed of a thin layer (<0.5 μpm) of microporous amorphous silica with an average pore diameter in the range of 0.3–0.4 nm. This layer is provided on the outside of a multilayer porous alumina support. The area of the membrane was 0.2 m². The content of the reactor was stirred during the experiment. The circulation speed was selected in such a manner that a turbulent cross-flow was established. The pressure at the permeate side, that is the inside of the membrane, was 5–20 mbar, while the pressure in the reactor was not over 4 bar during the process.

Example 1

An alkyd resin was manufactured from phthalic anhydride, 1,2 propanediol, pentaerytritol, di-pentaerytritol, pristerene 4963 and 3,3,5 trimethyl hexanoic acid.

Before and after each experiment a test was performed using pure water and a water/butanol mixture (5/95 wt. %) at 85° C. to determine the pervaporation capacity and selectivity of the membrane.

In the preparation of an alkyd resin the following procedure was followed.

After the reactants, mentioned below, had been added, the reactor was heated to a temperature of 235° C. At a temperature of 160° C. the circulation of the mixture over the outside of the tubular membrane was started. At the permeate side of the membrane a vacuum was applied (10–20 mbar). In some cases a sweep gas was employed. The pressure in the reactor was a function of the partial pressures of the reactants and hence non-boiling (isochoric). The maximum pressure reached during the experiment was 4 bar.

Table 1 lists the results for the standard experiments. The water permeance and the selectivity towards water are remarkably high and the results—before or after the production of alkyd resin—were comparable. This indicates that the membrane is stable in the reaction mixture employed.

Moreover, the selectivity was essentially improved but also the water permeance was unexpectedly higher than in a comparison test, where an alumina membrane with an average pore diameter of 3 nm was used. This membrane did hardly show any selectivity for water and the organic reactants were present in large quantities in the permeate.

TABLE 1

| Property | Performance |
| --- | --- |
| Pure water permeance | 20–40 kg · m$^{-2}$ · bar$_{H2O}^{-1}$ · h$^{-1}$ |
| Process selectivity butanol/water (95/5 wt. %) | 300–400 water enrichment factor |
| Water flux for butanol/water mixture | 3–4 kg · m$^{-2}$ · h$^{-1}$ |

The acid number of the reaction mixture is a measure of the conversion. After several hours it had reached the desired value (12). The degree of conversion reached was then about 96%.

Over 99.5 wt. % of the permeate was composed of water. This means that the selectivity of the membrane towards water in the reaction mixture is very high.

Example 2

On the basis of the data above it can be calculated that when the aforementioned alkyd resin is made on an industrial scale, there will be an energy saving of over 40% as compared with the conventional process (which does not make use of a membrane for the separation of water), while the efficiency of the reactor increases by at least 30%. Higher savings still are anticipated for many other applications.

In Table 2 the effect of using an inorganic membrane with an average pore size of 0.3–0.4 nm is illustrated with reference to a polymerisation process in which an alkyd resin is prepared.

These examples illustrate the effect of increasing the heating rate (2a–2d), increasing the membrane surface area (2e–2g), and of rendering the outside of the membrane catalytically active (2h, 2I). Example 2j represents a process with conventional removal of water (through distillation).

TABLE 2

| Ex. | DT/dt[1] (K/h) | AV Time[2] (h) | A$_{membrane}$[3] (m$^2$) | P$_{reactor}$[4] (bar) | Catalytic activity | max. H$_2$O[5] flux (kg · m$^{-3}$ · h$^{-1}$) |
| --- | --- | --- | --- | --- | --- | --- |
| 2a | 30 | 6.2 | 57 | 3.9 | 1 | 23 |
| 2b | 45 | 5.7 | 84 | 3.9 | 1 | 33.8 |
| 2c | 60 | 4.7 | 110 | 3.9 | 1 | 44.1 |
| 2d | 90 | 4.1 | 155 | 3.9 | 1 | 62.9 |
| 2e | 60 | 4.6 | 150 | 2.8 | 1 | 43 |
| 2f | 60 | 4.5 | 200 | 2.1 | 1 | 44 |
| 2g | 60 | 4.4 | 250 | 1.7 | 1 | 44 |
| 2h | 60 | 3.1 | 110 | 3.9 | 3 | 48 |
| 2I | 60 | 2.8 | 110 | 4.3 | 5 | 50 |
| 2j | Batch 30 | 6.5 | — | 1.0 | 1 | 24.5 |

[1]Heating rate of the reactor contents
[2]Average time needed to reach an acid number of 11 (practically full conversion).
[3]Surface area of the membrane, composed of tubular elements. The pressure on the inside of the membrane was 50 mbar.
[4]Pressure in the reactor.
[5]Maximum H$_2$O flux through the membrane It is clear that the desired acid number is reached much more quickly with more rapid heating (Examples 2a–2d). More rapid heating can be achieved with the existing heating capacity of the reactor. In comparison with distillation, there is a far lower loss of energy because the solvent does not have to be evaporated, and in addition it is possible to make use of the maximum heating capacity because as a result of the isochoric operating conditions the reaction mixture can no longer "boil over". At elevated temperatures the esterification reactions proceed much more quickly, as a result of which the required conversion will be achieved sooner. Depending on the maximum pressure in the reactor, the membrane surface area needed to be able to remove the water sufficiently quickly is minimal. At a heating rate of 60 K.h$^{-1}$ the minimum quantity of membrane surface area required is 110 m$^2$ (2c). Increasing the membrane area from 110 to 250 m$^2$ has only a limited effect (<10%; 2e–2g). On the other hand, increasing the catalytic activity from 1–5 by means of a heterogeneous catalyst on the outside of the membrane or near the membrane does give rise to a major acceleration of the process (2h, 2I).

Example 3

A butylated melamine resin was produced by reacting melamine, paraformaldehyd and n-butanol. After adding the reactants with n-butanol in excess, some demineralized water and an acid homogeneous catalyst to the reactor the blend was heated to 120° C. The circulation over the membrane started when the most of the solid material was dissolved. The pressure in the reactor and at the outside of the membrane was below 2 bar. After some hours the desired conversion was obtained and the reaction mixture was neutralized with NaOH. The permeate contained near 100% by weight of water and the amount of formaldehyd was less than 0.04% by weight and the amount of n-butanol about 0.3%. The maximum waterflux was 1700 g/m$^2$·h.

The result shows that the membrane is well suited to selectively remove the water formed during the reaction and to obtain a high yield of the desired resin. The loss of reactants in the permeate is very low.

Example 4

A methylated melamine resin was produced by reacting methanol, paraformaldehyde and melamine. In the process paraformaldehyde, an excess of methanol and a small amount of NaOH were first introduced into the reactor and the blend heated to 70° C. When the blend was almost clear the circulation over the membrane started. The pressure in the reactor and at the outside of the membrane was below 2 bar. Then, melamine was slowly added and the mixture heated to 75° C. followed by the addition of an acid homogeneous catalyst. After some hours the desired conversion was obtained and NaOH was added to neutralize the reaction mixture. The maximum flux through the membrane was about 750 g/m²·h.

Although the methanol concentration was high in the reaction mixture the selectivity for water is remarkably high. Thus the water content in the permeate varied from 92–99% by weight depending on the magnitude of the excess of methanol used. The remaining part of the permeate essentially consisted of methanol. No significant fouling or decrease in the membrane performance was observed although the membrane was used in several sequential syntheses.

Example 5

Hexylglucoside was prepared by first adding hexanol in large excess to the reactor. The hexanol was circulated over the membrane, whereupon glucose was added and the heterogeneous reaction mixture heated to 90° C., 100° C. or 110° C., and a homogeneous acid catalyst added. The pressure in the reactor and at the outside of the membrane was below 2 bar. After some hours the desired conversions were obtained. Depending on the temperatures used the maximum water flow varied from 500–1400 g/m²·h. The water selectivity of the membrane was very high and the permeate contained over 99.6% by weight of water. The losses of the reactants are almost negligible compared to the losses in an ordinary evaporation process. No fouling or decrease in the membrane performance was observed after several sequential syntheses. Moreover, the energy saving in the evaporation step is at least 50% compared with the ordinary method.

Example 6

A polyglycerol was prepared by introducing glycerol in the reactor and heated to 250° C., while the glycerol was circulated over the membrane and a heterogeneous acid catalyst in a packed bed. The pressure in the reactor and at the outside of the membrance was below 2 bar. The water was continuously removed during the reaction. The water content of the permeate was over 99.8%, which further illustrates the unexpected high water selectivity of the membrane.

We Claim:

1. A process for the preparation of an organic compound, wherein said compound is prepared by a condensation reaction carried out at a temperature above 70° C. and wherein in addition to said organic compound one or more other products are formed in the reaction mixture, said process comprising extracting said one or more of other products formed during said condensation reaction from the reaction mixture with the aid of an inorganic membrane containing a separating layer, wherein the average pore size of the separating layer of less than 0.5 nm.

2. The process of claim 1 wherein the organic compound is a polymer and condensation reaction is carried out at a temperature above 100° C.

3. The process of claim 1 wherein the organic compound is an alkylglycoside having the general formula $R(OA)_n(G)_mH$ where R is a hydrocarbon group with 1–20 carbon atoms, A is an alkylene group having 2–4 carbon atoms and n is a number from 0–10, G is a saccharide residue and m is a number from 1–10, produced by reacting $R(OA)_nH$ with a saccharide at a temperature from 80–130° C.

4. The process of claim 1 wherein the membrane is a ceramic membrane with an average pore size of 0.1–0.5 nm and has affinity towards the components to be extracted.

5. The process of claim 1 wherein the surface area of the membrane is catalytically active.

6. The process of claim 1 wherein the reaction is carried out isochorically.

7. The process of claim 1 wherein the reaction mixture is heterogeneous.

8. The process of claim 1 wherein water, methanol, ethanol and/or $NH_3$ is extracted from the reaction mixture.

9. The process of claim 1 wherein the reaction mixture is heated or cooled with the aid of the membrane.

10. The process of claim 1 wherein the reaction mixture is stirred with the aid of the membrane.

11. The process of claim 1 wherein the membrane is composed of a layer of microporous amorphous silica.

12. A method for improving the reaction rate of condensation reactions carried out at temperatures above 70° C., wherein said reaction forms, as by-products, a member from the group consisting essentially or water, ethanol, methanol, $NH_3$ and mixtures thereof, said method comprising removing one or more of said by-products from the reaction mixture with the aid of an inorganic membrane containing a separating layer, wherein the average pore size of the separating layer of less than 0.5 nm, thereby driving said condensation reaction towards formation of the desired product.

* * * * *